United States Patent [19]

Latham

[11] 4,075,923
[45] Feb. 28, 1978

[54] FASTENER TENSIONING APPARATUS

[76] Inventor: Raymond E. Latham, 231 Tamerlaine, Houston, Tex. 77024

[21] Appl. No.: 696,877

[22] Filed: Jun. 17, 1976

[51] Int. Cl.² .......................................... F16B 35/00
[52] U.S. Cl. ........................................ 85/1 T; 29/446
[58] Field of Search ................. 85/1 T, 32 T; 29/446, 29/452; 151/69, 41.76

[56] References Cited

U.S. PATENT DOCUMENTS

| 2,304,107 | 12/1942 | Leisure | 151/41.76 |
| 3,707,107 | 12/1972 | Bieri | 85/1 T |
| 3,837,694 | 9/1974 | Frisch | 85/1 T X |
| 3,841,193 | 10/1974 | Ito | 85/1 T X |

FOREIGN PATENT DOCUMENTS

| 1,061,185 | 3/1967 | United Kingdom | 85/32 T |

Primary Examiner—Ramon S. Britts
Attorney, Agent, or Firm—Bill B. Berryhill

[57] ABSTRACT

Apparatus and method for placing and holding tension on a fastener device of the type having a shaft and a cooperable member engageable therewith. The apparatus may comprise a housing member for surrounding the fastener shaft in a fixed relationship; a piston member disposed within the housing member for seating axial movement therein between first and second positions; a passageway centrally disposed in the housing and piston member through which the fastener shaft may extend and be affixed to the piston member; an annular chamber defined by the housing and piston members; and one or more ports communicating with the chamber through which pressure may be applied to the piston member for movement thereof between the first and second positions so as to place the fastener shaft in tension. A method of utilizing the apparatus is also disclosed.

8 Claims, 3 Drawing Figures

FASTENER TENSIONING APPARATUS

BACKGROUND OF THE INVENTION

1. Field of the Invention

The present invention pertains to apparatus and methods for fastening two or more objects together. In particular, it concerns apparatus and methods for fastening such objects together with fastener devices having shafts and cooperating members for holding the shafts in tension, i.e. bolts, studs and the like.

2. Description of the Prior Art

One of the problems associated with connecting objects together, such as flange-type connections, is the assurance that the connection is properly made up by placing the desired tension on the flange bolts or studs. Due to the friction involved with tightening a nut, it is difficult to assure that proper and equal tension is applied to all of the bolts or studs of the connection. Furthermore, it is physically difficult to apply the proper tension with an ordinary wrench. Even a torque wrench may not ensure proper and equal application of tension to the bolts and studs of the connections.

To overcome some of the problems associated with ordinary wrench and torque wrench application of tension, various bolt or stud tensioning apparatus have been developed. Examples of such apparatus may be seen in U.S. Pat. Nos. 2,866,370; 3,015,975; 3,158,052; 3,230,799; and 3,749,362. There are several problems associated with such stuc or bolt stretchers or tensioners. For one, they are relatively expensive to manufacture and use. To assure equal application of tension may require several pieces of equipment.

Since the bolt and stud tensioning apparatus of the prior art are expensive, they are naturally designed for reuse. As a result, most, if not all, of the bolt and stud tensioners of the prior art require attachment to the end of the stud for application of the tensioning force. This means that tension must be applied with the stud nut already engaged with the stud and that some means must be provided for internal access to the tensioning unit to tighten the stud nut upon application of the desired tensioning force. Although various mechanical devices have been developed to improve this feature, they make the unit more expensive, complex and difficult to apply.

SUMMARY OF THE INVENTION

The present invention provides stud or bolt tensioning apparatus and method which eliminate many of the problems of the prior art. The apparatus is both less complex and less expensive to manufacture and operate. The apparatus may comprise: a housing for surrounding the stud in a fixed relationship; a piston member disposed within and sealingly engaging the housing, a passageway centrally disposed in the housing and piston through which the stud shaft may extend and be attached to the piston member; at least one annular chamber defined by the housing and piston member; and at least one port communicating with the chamber through which pressure may be applied to the piston member for movement thereof to place the stud in tension.

In its method of use, the tensioning apparatus is placed around the stud shaft, with the stud nut removed, and the piston member attached to the shaft so that the shaft extends through the central passageway exposing one of its ends externally of the housing. Then pressure is applied to the chamber and against the piston so as to place a predetermined tension on the stud shaft. Then the exposed end of the stud shaft is engaged by a cooperating nut which is threaded thereon until it bears against the housing for holding the stud shaft in tension after removal of the pressure. If it is desired to subsequently release the attached objects or remove the studs therefrom, pressure may be reapplied to the chamber and against the piston to allow manual disengagement of the stud nut from the stud shaft.

Since this type of tensioning unit is simple and cheap to manufacture, it may be left in place as an expendable item at a cost less than that required when using removable stud tensioners of the prior art. One distinctive advantage of the stud tensioner of the present invention is that the stud is not gripped from the end, as in the prior art, allowing the nut to be placed on the end of the stud, after tensioning, for easy installation and manipulation. Furthermore, the design of the present invention lends itself to remote operation, and to usage where other methods and apparatus are unusable.

Many other objects and advantages of the invention will be apparent from a reading of the description which follows in conjunction with the accompanying drawing.

DESCRIPTION OF THE PREFERRED EMBODIMENTS

Figures 1, 2:
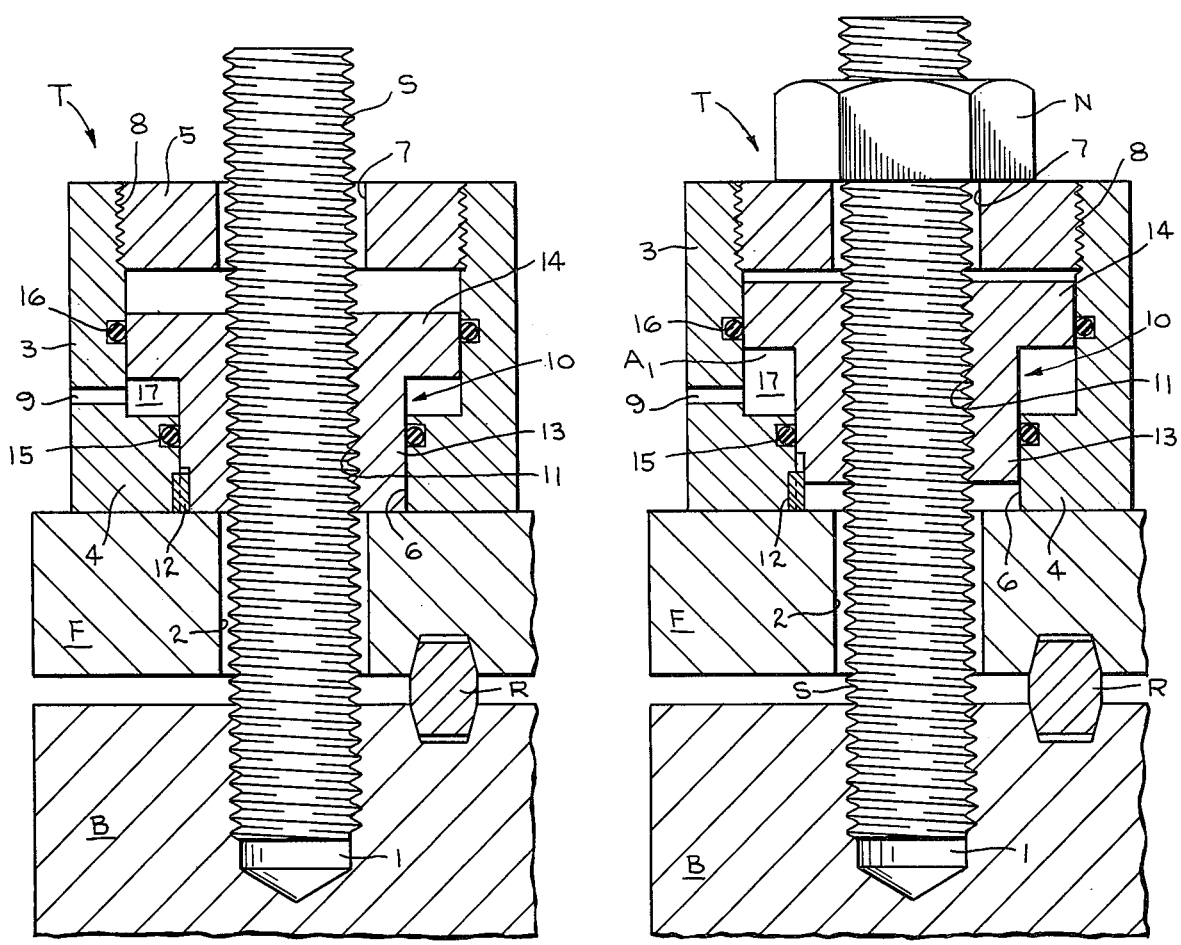
FIG. 1 is an elevation view, in section, of a preferred embodiment of the tensioning apparatus of the present invention, showing the apparatus in its initially installd position for placing a stud in tension.
FIG. 2 is an elevation view, in section, showing the preferred embodiment of the tensioning apparatus of FIG. 1, illustrating the apparatus in its final tensioning position.

Referring first to FIGS. 1 and 2, the tension apparatus T of the present invention is shown for use in placing and holding tension on a fastener device, such as a stud S. The stud S is shown for fastening two objects such as a body B and flange F of a flange type connection. An annular seal ring or gasket R is shown between the flange F and body B for establishing a fluidtight seal upon proper connection. The body B is tapped and threaded at 1 to threadedly receive one end of a fastener device such as the stud S. The flange F is provided with holes 2 through which the stud S may extend for eventual engagement by nut N (see FIG. 2).

The tensioning apparatus T comprises a cylindrical housing 3 having inwardly directed projections 4 and 5 forming the ends of the housing but leaving openings 6 and 7 therein. For assembly purposes, one or more of the projections 4 and 5, 5 in the present case, may be conveniently formed as a ring for threaded engagement at 8 with the remainder of the cylindrical housing 3. The housing may also have one or more ports 9 for providing fluid communication between the exterior and interior of the housing 3.

Centrally disposed within the housing 3 for relatie movement therein between a first position, as shown in FIG. 1, and a second position, as shown in FIG. 2, is a piston member 10. The piston member 10 is centrally bored and threaded at 11 and together with the openings 6 and 7 of the housing 3 provide a passageway through which the shaft of the stud S may extend for exposure of one of its ends externally of the tensioning apparatus T. The threaded bore 11 of the piston member 10 is threaded for cooperative engagement with the stud S.

Although the piston member 10 is free to move, within limits, in an axial direction relative to the housng 3, rotation relative thereto is prevented by a key and keyway assembly 12. Such as assembly may be provided by boring a hole whose axis lies at the interface between the housing projection 4 and the piston 10 and inserting a cylindrical key therein.

The piston member 10 comprises a cylindrical body portion 13 and a larger diameter head portion 14. The body portion 13 slidingly and sealingly engages the housing extension 4 and an annular seal 15 is provided therebetween. The piston head 14 slidingly and sealingly engages the interior wall of housing 3 and an annulr seal 16 is provided therebetween. The piston member 10 can be designed for any length of stroke necessary.

A variable annular chamber 17 is defined by the piston 10 and housing 3. The chamber 17 may be placed in fluid communication, through ports 9, with an external pressure source (not shown) for operation of the tensioning apparatus T.

In operation, the tensioning apparatus T is placed on the end of stud S, with the nut N removed. The tensioning apparatus may then be manually rotated causing the piston member 10 to threadedly engage the stud S and to be drawn toward the flange F. Rotation is continued until the housing 3 and possibly the piston member 10 rest firmly against the flange F as a supporting surface, leaving the end of stud S projecting externally of the housing 3, as shown in FIG. 1.

Then pressure may be applied from the external pressure source (not shown) to the chamber 17 through ports 9. This pressure is applied to the annular surface $A_1$ of the piston 10 causing the piston to move from its first or initial position of FIG. 1 to a second position, such as in FIG. 2. In the process, the stud S is stretched or tensioned. Since the annular area $A_1$ and the pressure applied thereto are easily determinable, the amount of tension placed on the stud S is easily controllable and measurable.

Upon application of a proper tensioning force through the stud S, the nut N may be placed on its exposed end and manually threaded or run onto the stud S until the nut N snugly rests against the housing projection 5. At this point, the pressure may be relieved from the chamber 17 and the stud S held in proper tension simply by the nut N and its engagement with the tensioning apparatus T. Ordinarily, the pressure source may then be removed for other uses.

If it is desired, at some subsequent time, to disconnect the body B and flange F, the pressure source may be again connected to the tension apparatus T for applying to the chamber 17 and piston member 10. Upon application of a sufficient force, the nut N may be manually disengaged and removed from the stud S leaving the tensioning apparatus T free for removal and consequently leaving the flange F free for disconnection from the body B. If desired, simple manual disengagement of the nut may be accomplished without use of pressure.

Figure 3:
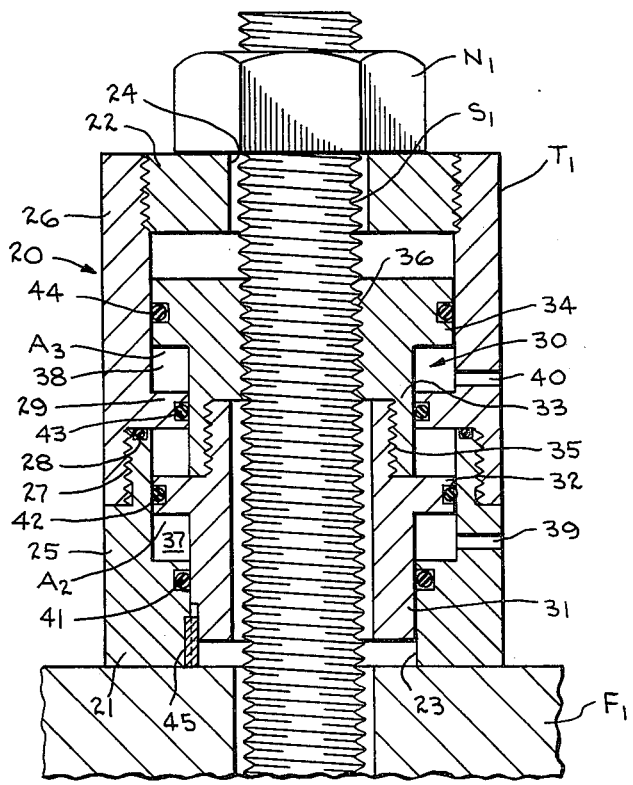
FIG. 3 is an elevation view, in section, illustrating an alternate embodiment of the tensioning apparatus of the present invention utilizing a multi-piston assembly.

An alternate embodiment of the invention is shown in FIG. 3 by which a greater amount of tensioning force may be applied to a stud $S_1$. The alternate tensioning apparatus $T_1$ is shown in a similar use for fastening a flange $F_1$ to a flange body (not shown).

Like in the previously described embodiment, the tensioning apparatus $T_1$ includes a cylindrical housing 20 having inwardly projecting ends 21 and 22 with openings 23 and 24 therein. However, in this embodiment, the housing may include two or more sections 25 and 26 threadedly connected at 27. Although it is not necessary, a seal 28 may be used to make this connection fluidtight. One of the sections 26 may provide an annular inwardly projecting shoulder 29 for dividing the housing into two piston areas, as will be more fully seen hereafter.

The piston assembly 30 of the embodiment of FIG. 3 may be made up of two pistons, the first having a body and head 31 and 32, respectively, and the second having a body and head 33 and 34, respectively. The pistons may be threadedly connected as at 35 to make up the piston assembly 30. One or both of the pistons, the upper one in FIG. 3, may be threaded, as at 36 for engagement with the stud $S_1$.

The lower piston and lower housing section 25 define a lower annular chamber 37. The upper piston and housing section 26 define an upper annular chamber 38. These chambers 37 and 38 may be placed in fluid communication with an external pressure source (not shown) through ports 39 and 40 in the housing 20. Sealing of the pistons and chambers are provided by annular seals 41, 42, 43, 44.

It is therefore clear that the piston assembly 30 is free to move, within limits, in an axial direction within the housing 20. Like in the previous embodiment, a key and keyway assembly 45 may be provided to prevent relative rotation of the piston assembly 30 within the housing 20.

Operation of the tensioning apparatus $T_1$ of FIG. 3 is similar to that of the previously described embodiment. Initially, the tensioning apparatus $T_1$ is placed around the exposed end of stud $S_1$ with the nut $N_1$ removed. Rotation of the tensioning apparatus $T_1$, through the threaded engagement 36 of the piston assembly 30 causes the housing 20 and piston assembly 30 to be drawn down snugly against the flange $F_1$.

Then pressure is applied through the chambers 37 and 38 forcing the piston assembly 30 to move from its first position to the second position of FIG. 3, placing the studs $S_1$ in tension. Since the piston assembly 30 has two annular surfaces, $A_2$ and $A_3$, against which this pressure is applied, a greater amount of tensioning force can be applied to the stud $S_1$ than in the embodiment of FIGS. 1 and 2. Again, since the areas $A_2$ and $A_3$ and the pressure applied thereto may be easily determined, a precisely measured and controlable force may be applied to the stud $S_1$.

After the proper force is applied, the nut $N_1$ may be engaged with the stud $S_1$ and manually run down until it rests against the housing projection 22. Then the external pressure source may be removed, the tension being permanently held on the stud by the engagement of nut $N_1$ with the tensioning apparatus $T_1$. As in the previously described embodiment, the external pressure source can be reapplied to the piston assembly 30 for subsequent removal of the nut $N_1$ and disconnection of the object being held by the stud $S_1$.

From the foregoing, it can be seen that the stud or bolt tensioner of the present invention is a definite improvement over those of the prior art. It is less expensive to manufacture and use. Due to its low cost and ease of operation, it may be left in place as an expendable item at a cost less than that required when using removable stud tensioners of the prior art.

Although the tensioning apparatus of the present invention has been described as single units for use on a single stud, it is to be clearly understood that several such units may be simultaneously utilized on a plurality of studs or other fasteners being used to connect two objects. In fact, a plurality of such units may be connected to a single pressure source so as to make up a unified assembly.

Furthermore, although only two embodiments of the invention have been described herein, many variations thereof can be made by those skilled in the art without departing from the spirit of the invention. Therefore, it is intended that the scope of the invention be limited only by the claims which follow.

I claim:

1. Apparatus for placing tension on a standard bolt or stud fastener device having a threaded shaft and a standard cooperating nut member for holding the shaft in tension while fastening two or more objects together, said apparatus comprising:

housing means for surrounding said fastener shaft in a fixed relationship thereto and against which said cooperating fastener nut member may bear, said housing means having end openings therein through one of which said shaft may extend for engagement by said fastener nut member externally of said housing means;

piston means disposed within and sealingly engaging said housing means and axially movable therein between a first position and an axially spaced second position, said piston means being centrally bored and threaded from one end to the other for removable and axially adjustable attachment to said threaded shaft, leaving the end of said shaft exposed externally of said housing means for said engagement by said nut member;

annular chamber means defined by said housing and piston means; and port means communicating with said chamber means through which pressure may be applied to said piston means for movement thereof between said first and second positions to place said fastener shaft in tension.

2. Tensioning apparatus as set forth in claim 1 in which said piston means comprises a tubular body and a head projecting radially therefrom, first seal means being provided between said piston body and said housing, second seal means being provided between said piston head and said housing.

3. Tensioning apparatus as set forth in claim 2 comprising means provided by said piston means and housing means cooperating to prevent rotation of said piston means relative to said housing means but allowing said axial movement therebetween.

4. Tensioning apparatus as set forth in claim 2 in which said housing means comprises a cylindrical body having first and second radial inward projecting end walls between which said piston head is confined.

5. Tensioning apparatus as set forth in claim 4 in which at least one of said end walls is removable from the remainder of said housing means to permit assembly or removal of said piston means.

6. Tensioning apparatus as set forth in claim 4 in which said second end wall provides a surface against which said fastener cooperating nut member may bear upon engagement with said fastener shaft to hold said shaft in tension upon relief of said pressure applied to said piston means.

7. Tensioning apparatus as set forth in claim 2 in which said piston means comprises first and second axially spaced heads projecting radially therefrom and said chamber means comprises first and second annular chambers defined by said housing, said piston body and said first and second heads, respectively.

8. Tensioning apparatus as set forth in claim 7 in which said first and second annular chambers are separated by a radial inwardly projecting wall of said housing means, third seal means being provided between said piston body and said wall so that upon communication of said pressure to said first and second annular chambers an increased force can be applied to said fastener shaft.

* * * * *